US012637019B2

(12) United States Patent
Raybold et al.

(10) Patent No.: US 12,637,019 B2
(45) Date of Patent: May 26, 2026

(54) INLINE POWER CONNECTOR FOR A POWER CONNECTOR SYSTEM

(71) Applicant: TE Connectivity Solutions GmbH, Schaffhausen (CH)

(72) Inventors: Christopher Ryan Raybold, Middletown, PA (US); David James Rhein, Riley, MI (US)

(73) Assignee: TE Connectivity Solutions GmbH (CH)

( * ) Notice: Subject to any disclaimer, the term of this patent is extended or adjusted under 35 U.S.C. 154(b) by 387 days.

(21) Appl. No.: 18/323,056

(22) Filed: May 24, 2023

(65) Prior Publication Data

US 2024/0391399 A1 Nov. 28, 2024

(51) Int. Cl.
| | |
|---|---|
| *B60R 16/02* | (2006.01) |
| *H01R 11/05* | (2006.01) |
| *H01R 13/648* | (2006.01) |
| *H01R 43/02* | (2006.01) |
| *H01R 11/09* | (2006.01) |

(52) U.S. Cl.
CPC ....... *B60R 16/0215* (2013.01); *H01R 13/648* (2013.01); *H01R 43/02* (2013.01); *H01R 11/05* (2013.01); *H01R 11/09* (2013.01); *H01R 2201/26* (2013.01)

(58) Field of Classification Search
CPC .. H01R 13/648; H01R 43/02; H01R 2201/26; H01R 11/09; H01R 11/05; H01R 13/11; H01R 11/28; B60R 16/0215

USPC .................................................. 439/522, 754
See application file for complete search history.

(56) References Cited

U.S. PATENT DOCUMENTS

| | | | | |
|---|---|---|---|---|
| 4,126,367 | A * | 11/1978 | Miller | H01R 11/03 |
| | | | | 439/522 |
| 8,573,987 | B1 * | 11/2013 | Schweitzer | H01R 9/226 |
| | | | | 439/457 |
| 8,608,506 | B2 * | 12/2013 | Zhao | H01R 13/6277 |
| | | | | 439/522 |
| 10,720,736 | B2 * | 7/2020 | Yamanashi | H01R 13/6592 |
| 11,101,604 | B2 * | 8/2021 | Machida | H01R 13/533 |
| 2023/0402773 | A1 * | 12/2023 | Sung | H01R 13/113 |
| 2024/0304358 | A1 * | 9/2024 | Izawa | H01R 13/6581 |

* cited by examiner

*Primary Examiner* — Renee S Luebke
*Assistant Examiner* — Paul D Baillargeon

(57) ABSTRACT

An inline power connector for a power cable harness includes a socket assembly having a busbar, a socket terminal, and first and second cable terminators at opposite ends terminated to corresponding first and second cables of the power cable harness. The inline power connector includes an inner housing holding the socket assembly and an inline shield surrounding the inner housing and coupled to cable shields of the cables. The inline power connector includes an outer housing having a cavity receiving the inline shield, the inner housing, and the socket assembly. The cables extend into opposite ends of the outer housing. The outer housing includes a hub inline between the first end and the second end configured to receive a pin terminal that is configured to be coupled to the socket terminal of the socket assembly.

20 Claims, 11 Drawing Sheets

INLINE POWER CONNECTOR FOR A POWER CONNECTOR SYSTEM

BACKGROUND OF THE INVENTION

The subject matter herein relates generally to power connector systems.

Power connectors are used to transmit power between various components in a system. Power may be transmitted by the power connectors between a battery and a load or between a charging inlet and a battery. For example, power connectors within a vehicle, such as an electric vehicle or a hybrid electric vehicle, may be used to supply power from the battery to another component within the vehicle or may be used to recharge the battery through a charging inlet. A typical electric vehicle includes numerous devices or subsystems that are powered by the battery. It is difficult to route the cable harnesses between the battery and each of the devices and subsystems. Additionally, the numerous cable harnesses add weight and cost to the system.

A need remains for a power connector system having a reduced part count that may be operated in a reliable manner.

BRIEF DESCRIPTION OF THE INVENTION

In one embodiment, an inline power connector for a power cable harness is provided. The inline power connector includes a socket assembly including a busbar and a socket terminal extending from the busbar. The busbar includes a first cable terminator at a first end of the busbar and a second cable terminator at a second end of the busbar. The first cable terminator is configured to be terminated to a first cable of the power cable harness. The second cable terminator is configured to be terminated to a second cable of the power cable harness. The socket terminal is located inline between the first cable terminator and the second cable terminator. The socket terminal includes a socket opening configured to receive a pin terminal. The inline power connector includes an inner housing having a busbar cavity receiving the busbar and a socket terminal cavity receiving the socket terminal. The inner housing holds the busbar in the busbar cavity and holds the socket terminal in the socket terminal cavity. The inner housing has a housing opening aligned with the socket opening to receive the pin terminal. The inner housing is configured to receive the first cable at a first end of the inner housing and configured to receive the second cable at a second end of the inner housing. The inline power connector includes an inline shield surrounding the inner housing. The inline shield has a first shield end configured to be coupled to a cable shield of the first cable. The inline shield has a second shield end configured to be coupled to a cable shield of the second cable. The inline shield includes a shield opening aligned with the socket opening to receive the pin terminal. The inline power connector includes an outer housing surrounding the inline shield. The outer housing has a cavity receiving the inline shield, the inner housing, and the socket assembly. The outer housing includes a first cable port at a first end of the outer housing configured to receive the first cable and a second cable port at a second end of the outer housing configured to receive the second cable. The outer housing includes a hub inline between the first end and the second end. The hub has a hub opening aligned with the socket opening to receive the pin terminal.

In another embodiment, a power connector system for connecting a power cable harness to a vehicle subsystem of an electric vehicle is provided. The power connector system includes a header power connector having a header housing that holds a header busbar and a pin terminal extending from the header busbar. The header busbar is configured to be terminated to the vehicle subsystem to power the vehicle subsystem. The power connector system includes an inline power connector coupled to the header power connector to supply power to the vehicle subsystem. The inline power connector includes a socket assembly, an inner housing holds the socket assembly, an inline shield surrounds the inner housing, and an outer housing surrounds the inline shield. The socket assembly includes a busbar and a socket terminal extending from the busbar. The busbar includes a first cable terminator at a first end of the busbar and a second cable terminator at a second end of the busbar. The first cable terminator is configured to be terminated to a first cable of the power cable harness. The second cable terminator is configured to be terminated to a second cable of the power cable harness. The socket terminal is located inline between the first cable terminator and the second cable terminator. The socket terminal includes a socket opening configured to receive the pin terminal. The socket terminal includes a spring ring in the socket opening electrically connected to the socket terminal. The spring ring includes spring elements in a circumferential arrangement having mating interfaces configured to electrically connect to the pin terminal. The inner housing has a busbar cavity receiving the busbar and a socket terminal cavity receiving the socket terminal. The inner housing holds the busbar in the busbar cavity and holds the socket terminal in the socket terminal cavity. The inner housing has a housing opening aligned with the socket opening to receive the pin terminal. The inner housing configured to receive the first cable at a first end of the inner housing and configured to receive the second cable at a second end of the inner housing. The inline shield has a first shield end configured to be coupled to a cable shield of the first cable. The inline shield has a second shield end configured to be coupled to a cable shield of the second cable. The inline shield includes a shield opening aligned with the socket opening to receive the pin terminal. The outer housing has a cavity receiving the inline shield. The inner housing, and the socket assembly. The outer housing includes a first cable port at a first end of the outer housing configured to receive the first cable and a second cable port at a second end of the outer housing configured to receive the second cable. The outer housing includes a hub inline between the first end and the second end. The hub has a hub opening aligned with the socket opening to receive the pin terminal. The hub is plugged into the header housing when the inline power connector is coupled to the header power connector.

In a further embodiment, a power cable harness for connecting a battery to a plurality of vehicle subsystems of an electric vehicle is provided. The power cable harness includes a primary line power cable extending between a first cable end and a second cable end. The primary line power cable has a first cable end connector at the first cable end of the primary line power cable configured to be coupled to the battery. The power cable harness includes an intermediate line power cable extending between a first cable end and a second cable end. The intermediate line power cable has a first inline power connector at the first cable end of the intermediate line power cable and a second inline power connector at the second cable end of the intermediate line power cable. The first inline power connector is terminated to the second cable end of the primary line power cable to receive power from the primary line power cable. The first inline power connector is configured to be coupled to a first vehicle subsystem of the plurality of vehicle subsystems to supply power to the first vehicle subsystem. The second inline power is connector configured to be coupled to a second vehicle subsystem of the plurality of vehicle subsystems to supply power to the second vehicle subsystem. The power cable harness includes an end line power cable extending between a first cable end and a second cable end. The first cable end of the end line power cable is terminated to the second inline power connector. The end line power cable has a second cable end connector at the second end of the end line power cable configured to be coupled to a third vehicle subsystem of the plurality of vehicle subsystems to supply power to the third vehicle subsystem.

DETAILED DESCRIPTION OF THE INVENTION

Figure 1:
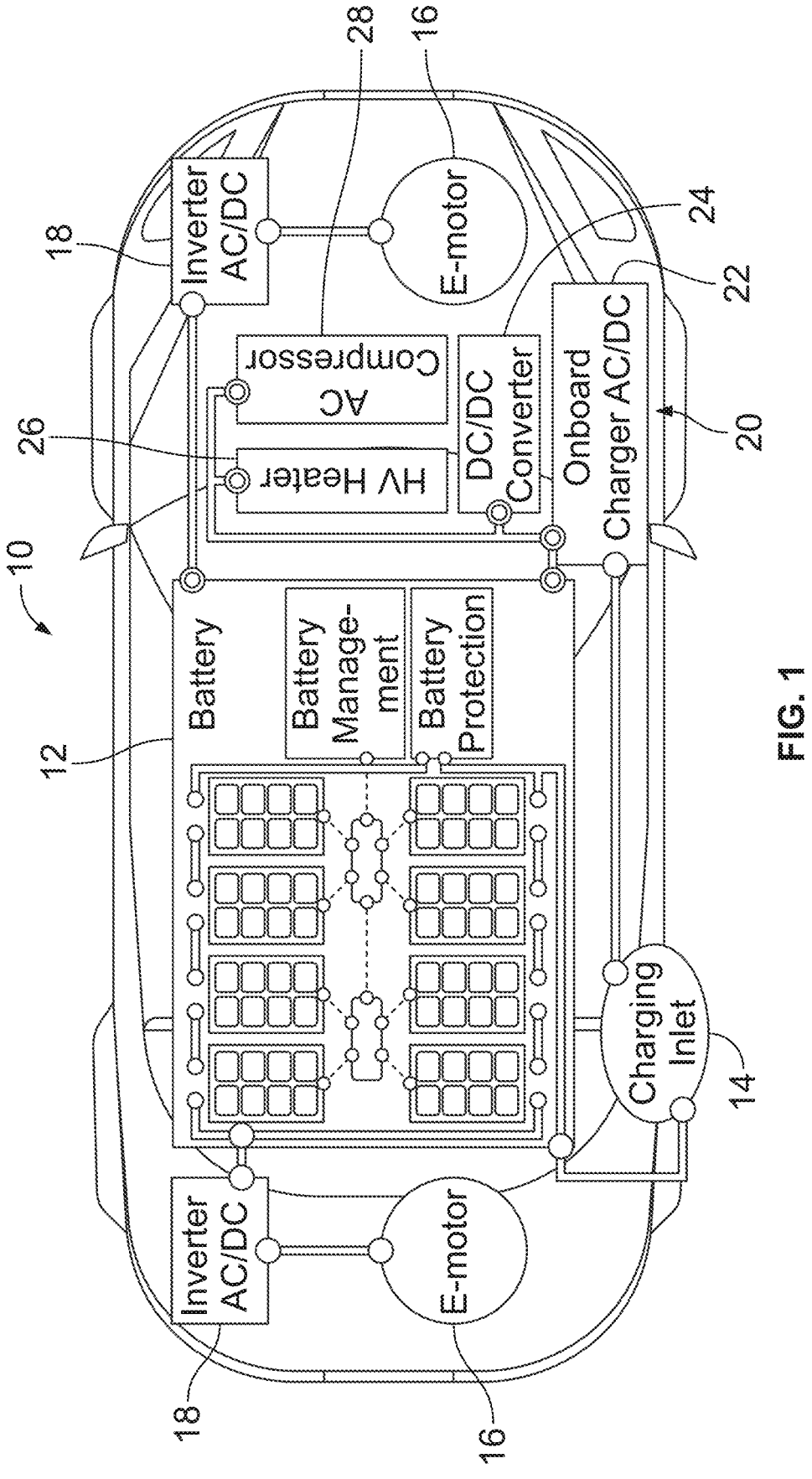
FIG. 1 illustrates an electric vehicle having a power connector system in accordance with an exemplary embodiment.

FIG. 1 illustrates an electric vehicle having a power connector system 100 in accordance with an exemplary embodiment. The power connector system 100 is used for powering various components and subsystems of the electric vehicle 10. In an exemplary embodiment, the power connector system 100 is used for transferring power to or from a battery 12 of the electric vehicle 10. For example, the power connector system 100 is used to electrically connect the battery 12 to a charging inlet 14 for recharging the battery 12. The power connector system 100 is used to electrically connect the battery 12 to an electric motor 16, such as through an alternating current/direct current (AC/DC) inverter 18. The electric vehicle 10 may include multiple electric motors 16 and AC/DC inverters 18. The power connector system 100 is used to electrically connect the battery 12 to other vehicle subsystems 20, such as an onboard AC/DC charger 22, a DC/DC converter 24, a heater 26, an AC compressor 28, and the like. The power connector system 100 may be used to electrically connect the battery 12 to other vehicle subsystems and/or accessories. The power connector system 100 uses power cable harnesses 102 to connect the battery 12 to the various components or subsystems of the electric vehicle 10.

In an exemplary embodiment, the power connector system 100 uses a daisy chain architecture to reduce the number of connectors, to reduce the size and weight of the power cables in the electric vehicle 10, to decrease manufacturing cost, and offer a scalable and flexible solution for powering the vehicle subsystems 20 of the electric vehicle 10. The power connector system 100 may be a high power connector system, such as capable of handling high voltage and/or amperage. In an exemplary embodiment, the power connector system 100 uses a single power cable harness 102 to connect the battery 12 to the onboard AC/DC charger 22, the DC/DC converter 24, the heater 26, and the AC compressor 28. The connections to the onboard AC/DC charger 22, the DC/DC converter 24, the heater 26, and the AC compressor 28 are daisy-chained through a single power cable harness 102 (for example, using a single termination to the battery 12 rather than individual connections from the battery 12 to the components/subsystems).

Figure 2:
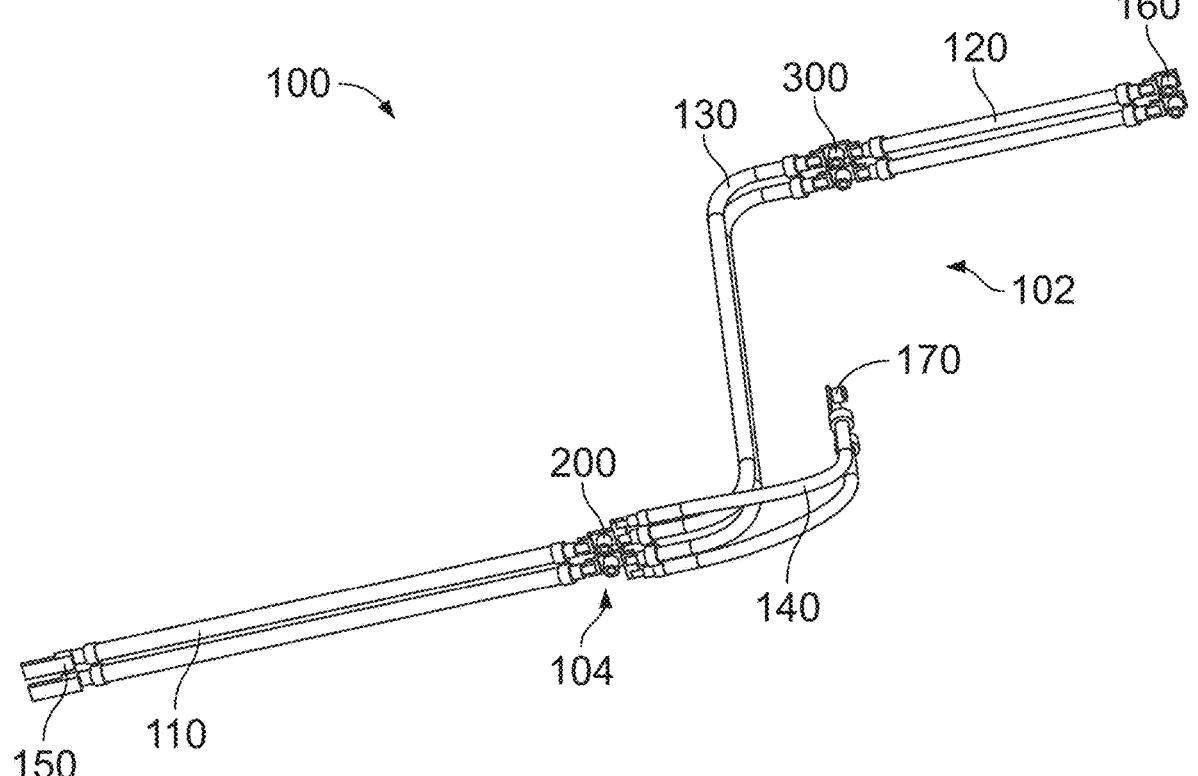
FIG. 2 illustrates the power cable harness of the power connector system in accordance with an exemplary embodiment.

FIG. 2 illustrates the power cable harness 102 of the power connector system 100 in accordance with an exemplary embodiment. The power cable harness 102 includes multiple terminations 104 for connection to the various components (for example, the battery 12, the onboard AC/DC charger 22, the DC/DC converter 24, the heater 26, and the AC compressor 28 shown in FIG. 1). In the illustrated embodiment, the power cable harness 102 includes five terminations 104; however, the power cable harness 102 may include greater or fewer terminations 104 in alternative embodiments.

In an exemplary embodiment, the power cable harness 102 includes a primary line power cable 110 and an end line power cable 120. The power cable harness 102 may include one or more intermediate line power cables 130. The power cable harness 102 may include one or more branch line power cables 140. In the illustrated embodiment, the power cable harness 102 includes both the intermediate line power cable 130 and the branch line power cable 140. However, other arrangements are possible in alternative embodiments. The description herein is with reference to a single power transmission line (for example, positive transmission line). However, it is realized that the power connector system 100 may include dual power transmission lines (for example, positive transmission line and negative transmission line). For example, the power cable harness 102 may include a mirrored power cable harness in parallel with the power cable harness 102. The power cable harnesses 102 may be tied together, such as using a sleeve or outer jacket to hold the cables in parallel for easier routing within the electric vehicle 10.

The primary line power cable 110 is configured to be coupled to the battery 12 by a cable end connector 150. The intermediate line power cable 130 is configured to be coupled to the primary line power cable 110 by an inline power connector 200. The end line power cable 120 is configured to be coupled to the intermediate line power cable 130 by an inline power connector 300. In the illustrated embodiment, the branch line power cable 140 is configured to be coupled to the primary line power cable 110 via the inline power connector 200. For example, the inline power connector 200 may be a split inline power connector configured to split the power from the primary line cable 110 to the intermediate line power cable 130 and the branch line power cable 140. However, in alternative embodiments, the branch line power cable 140 may be coupled to the intermediate line power cable 130 by the inline power connector 300, which may be a split inline power connector. In other alternative embodiments, rather than using the branch line power cable 140, an additional intermediate line power cable 130 may be provided in series between the primary line power cable 110 and the end line power cable 120 using an additional inline power connector.

In an exemplary embodiment, the primary line power cable 110 is a high voltage shielded cable. In various embodiments, the primary line power cable 110 may be a 50 mm² shielded cable. However, the primary line power cable 110 may be a different gauge wire in alternative embodiments. The primary line power cable 110 extends between a first cable end 112 and a second cable end 114. The cable end connector 150 is provided at the first cable end 112 and the inline power connector 200 is provided at the second cable end 114. The cable end connector 150 may be crimped or welded to the first cable end 112 and the inline power connector 200 may be crimped or welded to the second cable end 114.

The cable end connector 150 is configured to be coupled to the battery 12. In an exemplary embodiment, the cable end connector 150 includes a socket terminal configured to receive a pin terminal (not shown) of the battery 12. Other types of mating interfaces may be provided for connection to the battery 12, such as a ring terminal, a pin terminal, a weld pad, and the like. In the illustrated embodiment, the cable end connector 150 has a 180° mating end provided in line with the primary line power cable 110. However, in alternative embodiments, the cable end connector 150 may have a 90° mating end oriented at a right angle relative to the primary line power cable 110.

In an exemplary embodiment, the intermediate line power cable 130 is a high voltage shielded cable. In various embodiments, the intermediate line power cable 130 may be smaller than the primary line power cable 110, such as to save cost and weight. For example, the intermediate line power cable 130 may be a 35 mm² shielded cable. The intermediate line power cable 130 may be a different gauge wire in alternative embodiments. The intermediate line power cable 130 extends between a first cable end 132 and a second cable end 134. The inline power connector 200 is provided at the first cable end 132 and the inline power connector 300 is provided at the second cable end 134. The inline power connector 200 may be crimped or welded to the first cable end 132 and the inline power connector 300 may be crimped or welded to the second cable end 134. The intermediate line power cable 130 receives power from the primary line power cable 110. The first inline power connector 200 is configured to be coupled to a first vehicle subsystem of the electric vehicle 10, such as the onboard AC/DC charger 22 to supply power to the onboard AC/DC charger 22. The second inline power connector 300 is configured to be coupled to a second vehicle subsystem of the electric vehicle 10, such as the heater 26 to supply power to the heater 26. The inline power connectors 200, 300 may include socket terminals configured to be mated with corresponding pin terminals mounted to the corresponding vehicle subsystems.

In an exemplary embodiment, the end line power cable 120 is a high voltage shielded cable. In various embodiments, the end line power cable 120 may be smaller than the intermediate line power cable 130, such as to save cost and weight. For example, the end line power cable 120 may be a 25 mm² shielded cable. The end line power cable 120 may be a different gauge wire in alternative embodiments. The end line power cable 120 extends between a first cable end 122 and a second cable end 124. The inline power connector 300 is provided at the first cable end 122 and a cable end connector 160 is provided at the second cable end 124. The inline power connector 300 may be crimped or welded to the first cable end 122 and the cable end connector 160 may be crimped or welded to the second cable end 124. The end line power cable 120 receives power from the intermediate line power cable 130. The cable end connector 160 is configured to be coupled to a vehicle subsystem of the electric vehicle 10, such as the AC compressor 28 to supply power to the AC compressor 28. The cable end connector 160 may include a socket terminal 162 configured to be mated with a corresponding pin terminal mounted to the corresponding vehicle subsystems. In the illustrated embodiment, the cable end connector 160 has a 90° mating end oriented at a right angle relative to the end line power cable 120. Other orientations are possible in alternative embodiments. Other types of mating interfaces may be provided for connection to the vehicle subsystem, such as a ring terminal, a pin terminal, a weld pad, and the like.

In an exemplary embodiment, the branch line power cable 140 is a high voltage shielded cable. In various embodiments, the branch line power cable 140 may be smaller than the primary line power cable 110, such as to save cost and weight. For example, the branch line power cable 140 may be a 16 mm² shielded cable. The branch line power cable 140 may be a different gauge wire in alternative embodiments. The branch line power cable 140 extends between a first cable end 142 and a second cable end 144. The inline power connector 200 is provided at the first cable end 142 and a cable end connector 170 is provided at the second cable end 144. The inline power connector 200 may be crimped or welded to the first cable end 122 and the cable end connector 170 may be crimped or welded to the second cable end 124. The branch line power cable 140 receives power from the primary line power cable 110. The cable end connector 170 is configured to be coupled to a vehicle subsystem of the electric vehicle 10, such as the DC/DC converter 24 to supply power to the DC/DC converter 24. The cable end connector 170 may include a socket terminal 172 configured to be mated with a corresponding pin terminal mounted to the corresponding vehicle subsystems. In the illustrated embodiment, the cable end connector 170 has a 90° mating end oriented at a right angle relative to the end line power cable 120. Other orientations are possible in alternative embodiments. Other types of mating interfaces may be provided for connection to the vehicle subsystem, such as a ring terminal, a pin terminal, a weld pad, and the like.

In an exemplary embodiment, the intermediate line power cable 130 is daisy chained to the primary line power cable 110 by the first inline power connector 200, the branch line power cable 140 is daisy chained to the primary line power cable 110 by the first inline power connector 200, and the end line power cable 120 is daisy chained to the intermediate line power cable 130 by the second inline power connector 300.

Figure 3:
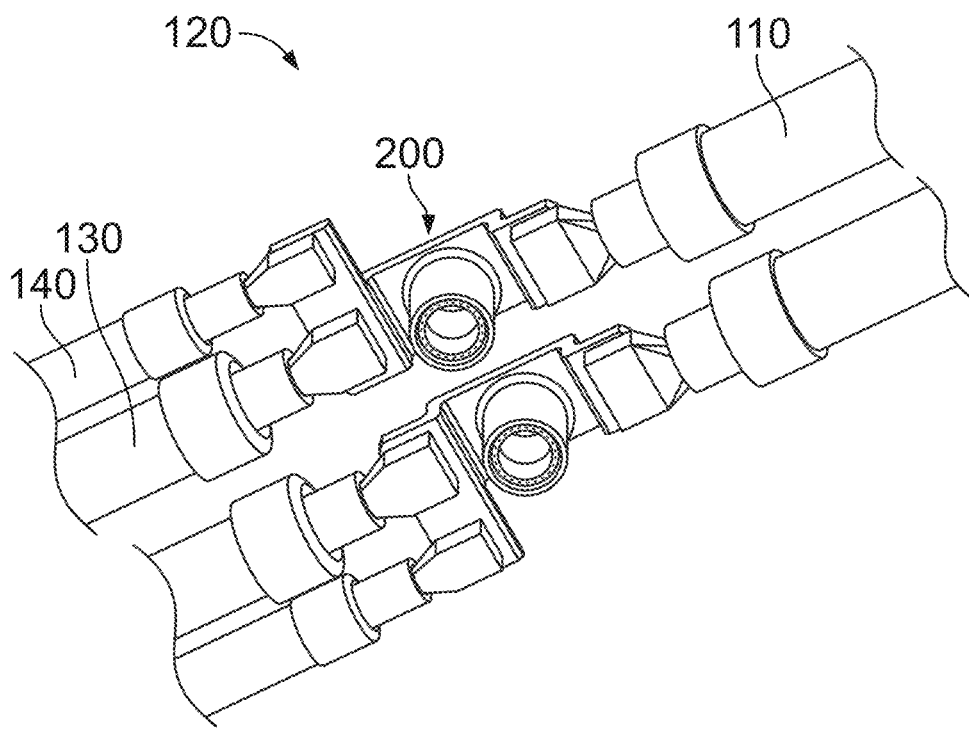
FIG. 3 illustrates a portion of the power cable harness showing a portion of the inline power connector in accordance with an exemplary embodiment.

FIG. 3 illustrates a portion of the power cable harness 102 showing a portion of the inline power connector 200 in accordance with an exemplary embodiment. The inline power connector 200 connects the primary line power cable 110 to the intermediate line power cable 130 and the branch line power cable 140. In an exemplary embodiment, the primary line power cable 110 is welded to one side of the inline power connector 200 and the intermediate and branch line power cables 130, 140 are welded to the opposite side of the inline power connector 200. The inline power connector 200 is arranged inline with power cables 110, 130, 140.

Figure 4:
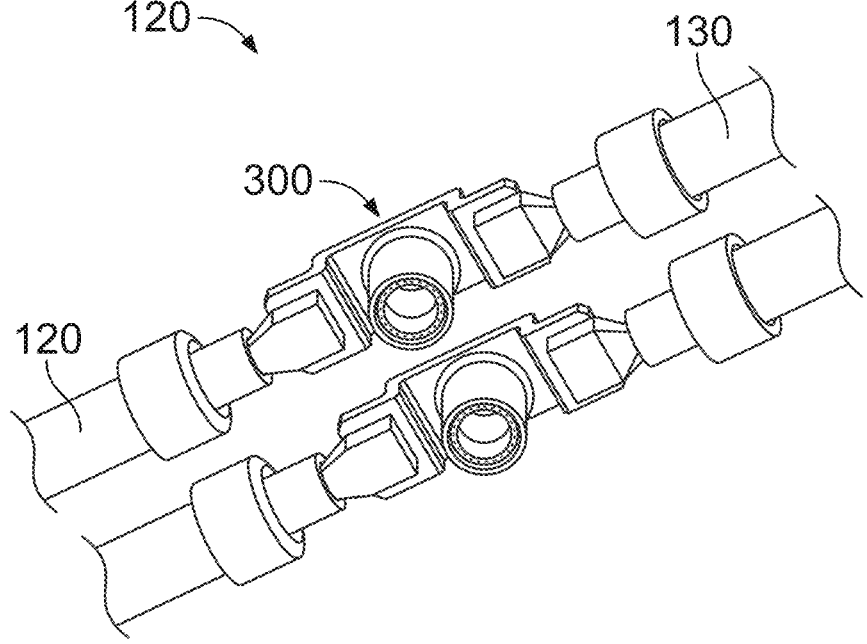
FIG. 4 illustrates a portion of the power cable harness showing a portion of the inline power connector in accordance with an exemplary embodiment.

FIG. 4 illustrates a portion of the power cable harness 102 showing a portion of the inline power connector 300 in accordance with an exemplary embodiment. The inline power connector 300 connects the intermediate line power cable 130 to the end line power cable 120. In an exemplary embodiment, the intermediate line power cable 130 is welded to one side of the inline power connector 300 and the end line power cable 120 is welded to the opposite side of the inline power connector 300. The inline power connector 300 is arranged inline with power cables 120, 130.

Figure 5:
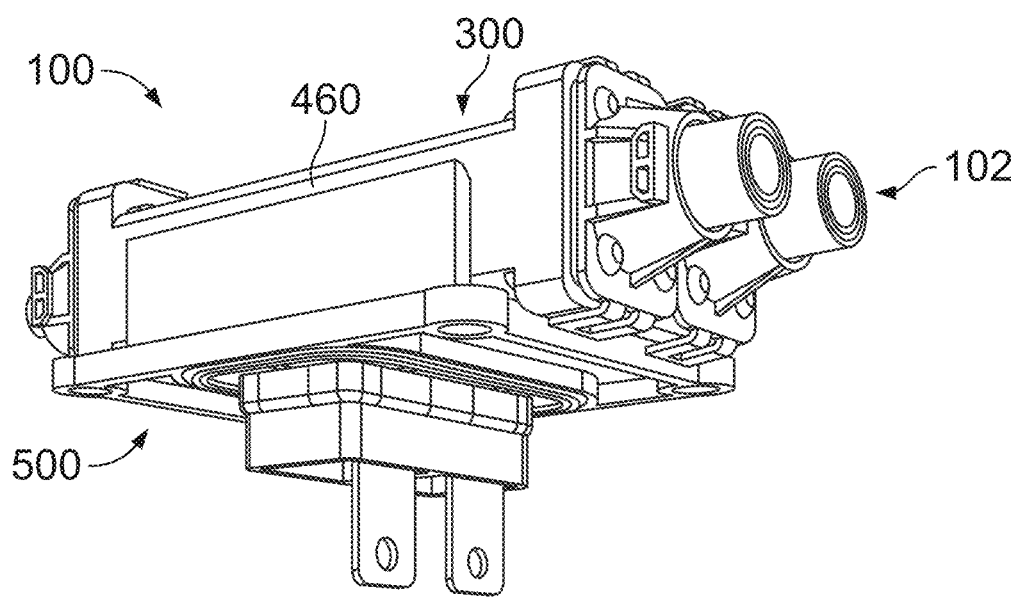
FIG. 5 is a perspective view of a portion of the power connector system showing the inline power connector and a header power connector in a mated state in accordance with an exemplary embodiment.
Figure 6:
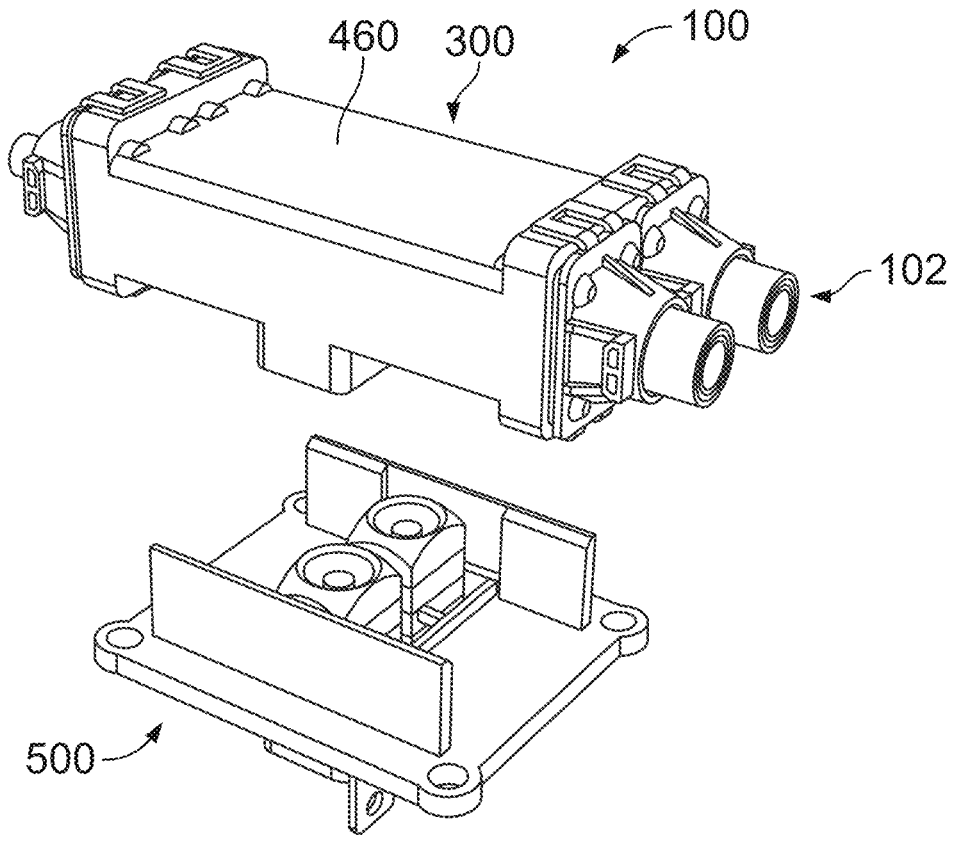
FIG. 6 is a perspective view of a portion of the power connector system showing the inline power connector poised for mating with the header power connector in accordance with an exemplary embodiment.

FIG. 5 is a perspective view of a portion of the power connector system 100 showing the inline power connector 300 and a header power connector 500 in a mated state. FIG. 6 is a perspective view of a portion of the power connector system 100 showing the inline power connector 300 poised for mating with the header power connector 500. In an exemplary embodiment, the in-line power connector 300 and the header power connector 500 accommodate dual power transmission lines (for example, both positive lines and negative lines). However, in alternative embodiments, a pair of the connectors 300, 500 is provided, each having a single power transmission line (for example, either positive line or negative line). By combining the power transmission lines into the single in-line power connector 300 and the single header power connector 500, the number of parts may be decreased and assembly is made easier.

In an exemplary embodiment, the header power connector 500 is configured to be coupled to one of the vehicle subsystems 20. For example, the header power connector 500 may be mounted to the device or component to supply power to the vehicle subsystem 20. The in-line power connector 300 is configured to be coupled to the header power connector 500 to electrically connect the power cable harness 102 to the vehicle subsystem 20. In an exemplary embodiment, the header power connector 500 includes male mating components and the in-line power connector 300 includes female mating components configured to be mated at the separable mating interface. For example, the header power connector 500 includes pin terminals and the in-line power connector 300 includes a socket terminals.

The in-line power connector 300 includes an outer housing 460 that surrounds the internal components of the in-line power connector(s) 300. The cables extend into the outer housing 460 and are terminated to the socket assembly in the interior of the outer housing 460. The in-line power connector 300 provides a sealed and shielded mating interface for mating with the header power connector 500.

Figure 7:
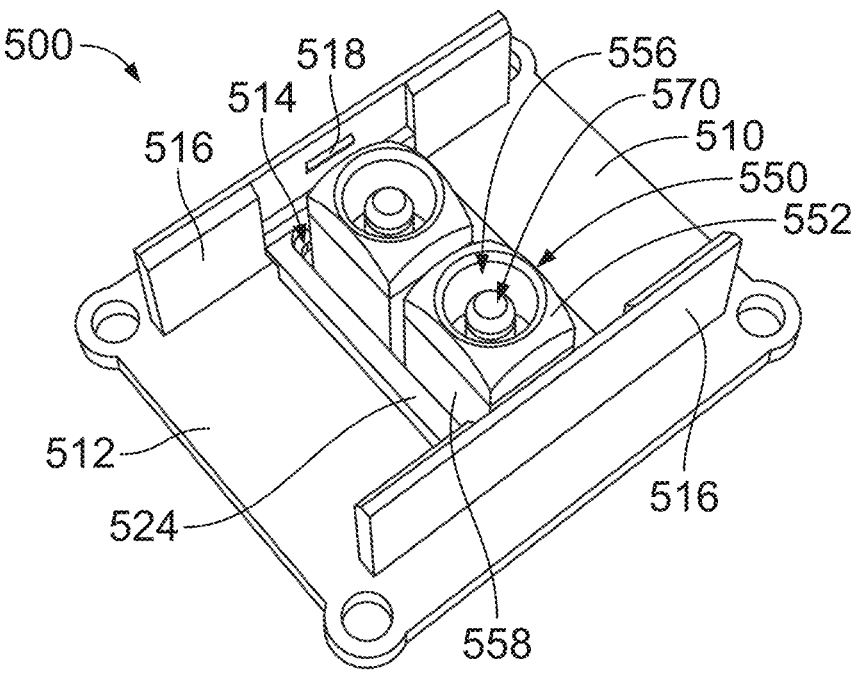
FIG. 7 is a top perspective view of the header power connector in accordance with an exemplary embodiment.
Figure 8:
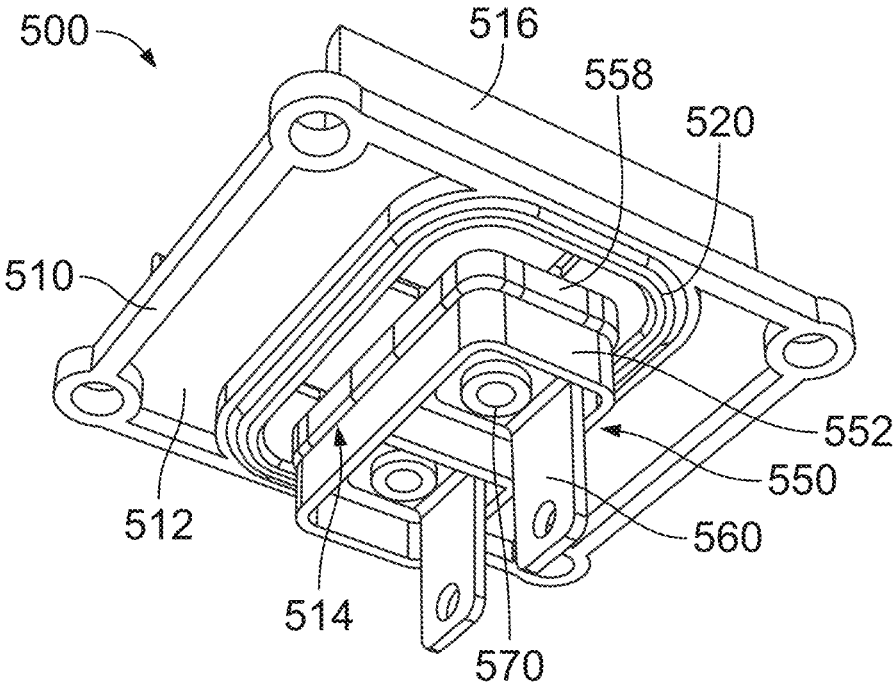
FIG. 8 is a bottom perspective view of the header power connector in accordance with an exemplary embodiment.
Figure 9:
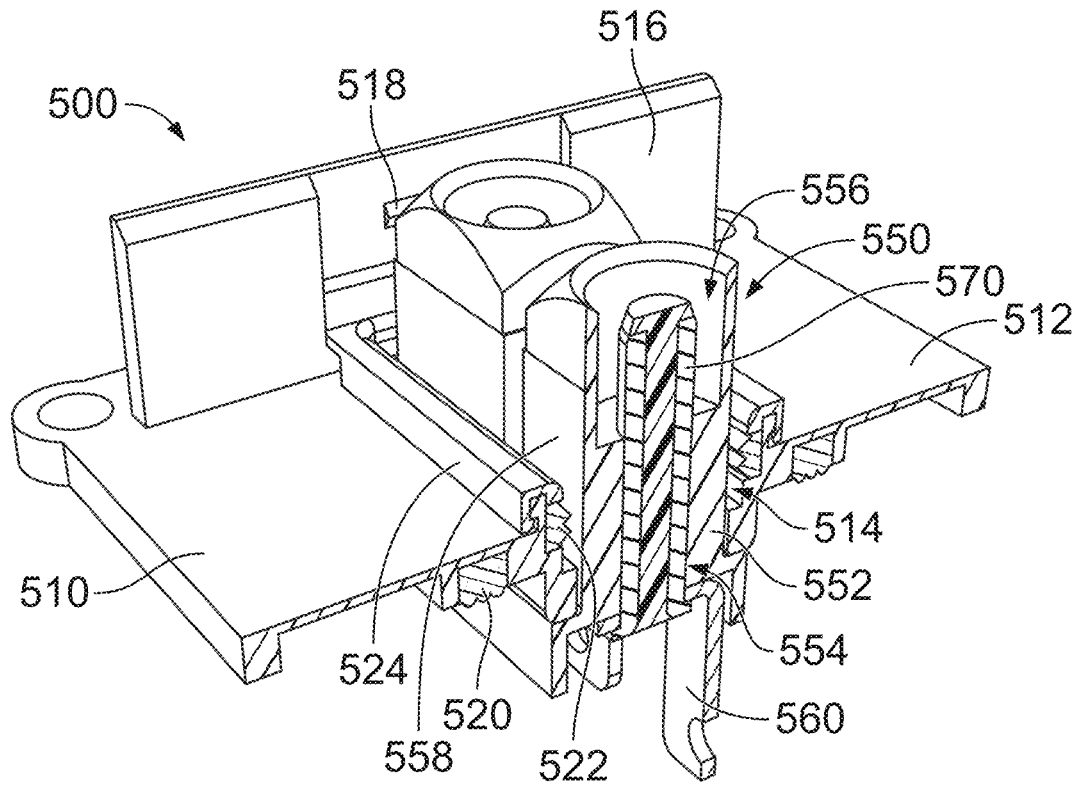
FIG. 9 is a cross-sectional view of the header power connector in accordance with an exemplary embodiment.

FIG. 7 is a top perspective view of the header power connector 500 in accordance with an exemplary embodiment. FIG. 8 is a bottom perspective view of the header power connector 500 in accordance with an exemplary embodiment. FIG. 9 is a cross-sectional view of the header power connector 500 in accordance with an exemplary embodiment.

The header power connector 500 includes a header housing 510 holding a terminal assembly 550. The terminal assembly 550 includes an insert 552 holding a busbar 560 and a pin terminal 570. The insert 552 surrounds the mating end of the pin terminal 570 to provide a touch safe enclosure around the pin terminal 570.

The header housing 510 includes a panel 512 configured to be mounted to the device or component of the vehicle subsystem 20. For example, the panel 512 may be secured by fasteners, latches, clips or other securing means. The panel 512 includes a header opening 514 therethrough. The terminal assembly 550 is received in the header opening 514. The header housing 510 includes one or more locating walls 516 extending from the panel 512. The locating walls 516 are used to locate or position the in-line power connector 300 during mating. The header housing 510 may include securing features 518 for securing the in-line power connector 300 to the header power connector 500. For example, the securing features 518 may include latches, fasteners, clips, or other securing means.

In an exemplary embodiment, the header power connector 500 includes a device seal 520 for sealing the header housing 510 to the device of the vehicle subsystem 20. The device seal 520 may be located at a bottom of the panel 512. The device seal 520 may completely surround the terminal assembly 550 to provide a sealed interface between the header power connector 500 and the device.

In an exemplary embodiment, the header power connector 500 includes an interface seal 522 for sealing between the header power connector 500 and the in-line power connector 300. The interface seal 522 may be coupled to the panel 512 at the header opening 514. A portion of the in-line power connector 300 may be plugged into the header opening 514 to interface with the interface seal 522. A seal retainer 524 may be provided to retain the interface seal 522 in the header opening 514. In alternative embodiments, the interface seal 522 may be provided on the insert 552 to interface with the in-line power connector 300.

In an exemplary embodiment, the insert 552 is separate and discrete from the header housing 510. The insert 552 is configured to be plugged into the header opening 514, such as from below the panel 512. In an exemplary embodiment, the insert 552 is manufactured from a dielectric material, such as a plastic material. The insert 552 may be a molded part. In various embodiments, the insert 552 may be over-molded around the pin terminal 570 and/or the busbar 560. In other embodiments, the pin terminal 570 and/or the busbar 560 may be loaded into the insert 552. For example, the pin terminal 570 extends into a terminal channel 554 of the insert 552 to extend from a bottom of the insert 552 to a top of the insert 552. In an exemplary embodiment, the insert 552 includes a cavity 556 at the top of the insert 552. The cavity 556 may receive a portion of the in-line power connector 300, such as the socket terminal of the in-line power connector 300.

In an exemplary embodiment, the terminal assembly 550 includes a header shield 558 surrounding a portion of the insert 552. The header shield 558 is configured to be electrically coupled to the in-line power connector 300 to electrically common the in-line power connector 300 and the header power connector 500. The header shield 558 may be coupled to the panel 512 of the header housing 510 and may be electrically commoned with the device when the header power connector 500 is coupled to the device.

Figure 10:
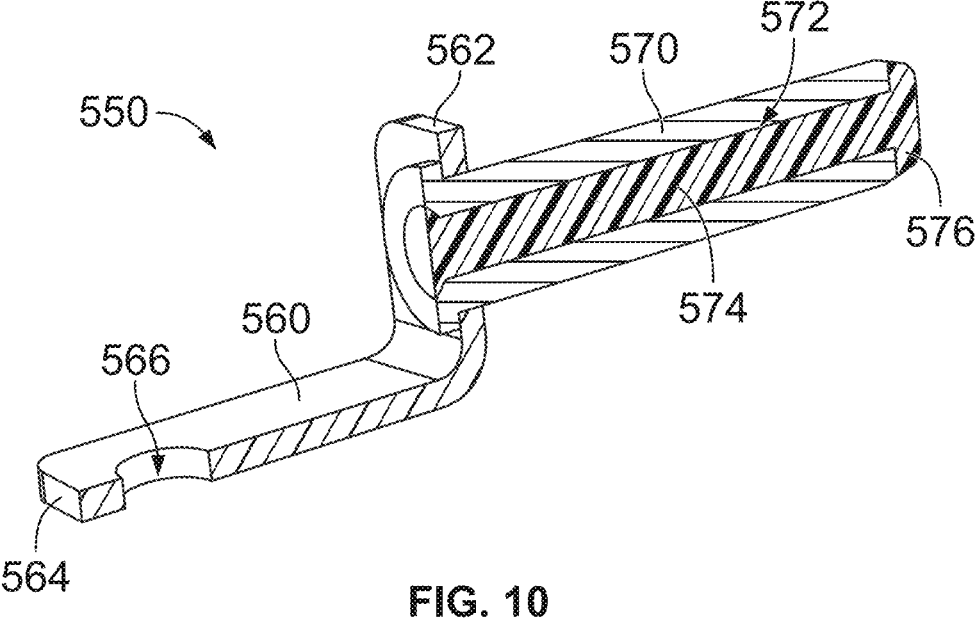
FIG. 10 is a perspective view of the busbar and the pin terminal of the terminal assembly in accordance with an exemplary embodiment.

With additional reference to FIG. 10, a perspective view of the busbar 560 and the pin terminal 570 of the terminal assembly 550 is shown. The busbar 560 is manufactured from a conductive material, such as a metal material, such as copper or a copper alloy. Optionally, the busbar 560 may be stamped and formed from a metal plate. The busbar 560 is located at a bottom of the header power connector 500. The busbar 560 is configured to be electrically connected to the device to power the device of the vehicle subsystem 20. For example, the busbar 560 extends between a first end 562 and a second end 564. The pin terminal 570 extends from the first end 562. The second end 564 is configured to be terminated to the device. For example, the second end 564 may include an opening 566 that receives a bolt or post of the device. The busbar 560 may be connected to the device using a threaded nut connected to the bolt or post. In other various embodiments, the second end 564 may include a weld pad configured to be welded to a conductor or cable of the device. In the illustrated embodiment, the busbar 560 is bent at a right angle such that the first end 562 is perpendicular to the second end 564. However, the busbar 560 may have other shapes in alternative embodiments.

The pin terminal 570 extends from the busbar 560. The pin terminal 570 is manufactured from an electrically conductive material, such as copper, aluminum, and the like. In various embodiments, the pin terminal 570 is integral with the busbar 560, such as being extruded together with the busbar 560. However, in alternative embodiments, the pin terminal 570 is separate and discrete from the busbar 560. The pin terminal 570 is press-fit and/or welded to the first end 562 of the busbar 560. In an exemplary embodiment, the pin terminal 570 is a forged part. However, the pin terminal 570 may be machined or stamped and formed in alternative embodiments. In an exemplary embodiment, the pin terminal 570 is hollow having a bore 572 that extends between the ends of the pin terminal 570. A dielectric insert 574 fills the bore 572. The dielectric insert 574 may be heat staked at the proximal end of the pin terminal 570. In an exemplary embodiment, the dielectric insert 574 includes a protective cap 576 at the distal end of the pin terminal 570. The protective cap 576 may be heat staked to the end of the pin terminal 570. The protective cap 576 provides a touch safe feature at the end of the pin terminal 570. The protective cap 576 prevents touching the end of the pin terminal 570.

Figure 11:
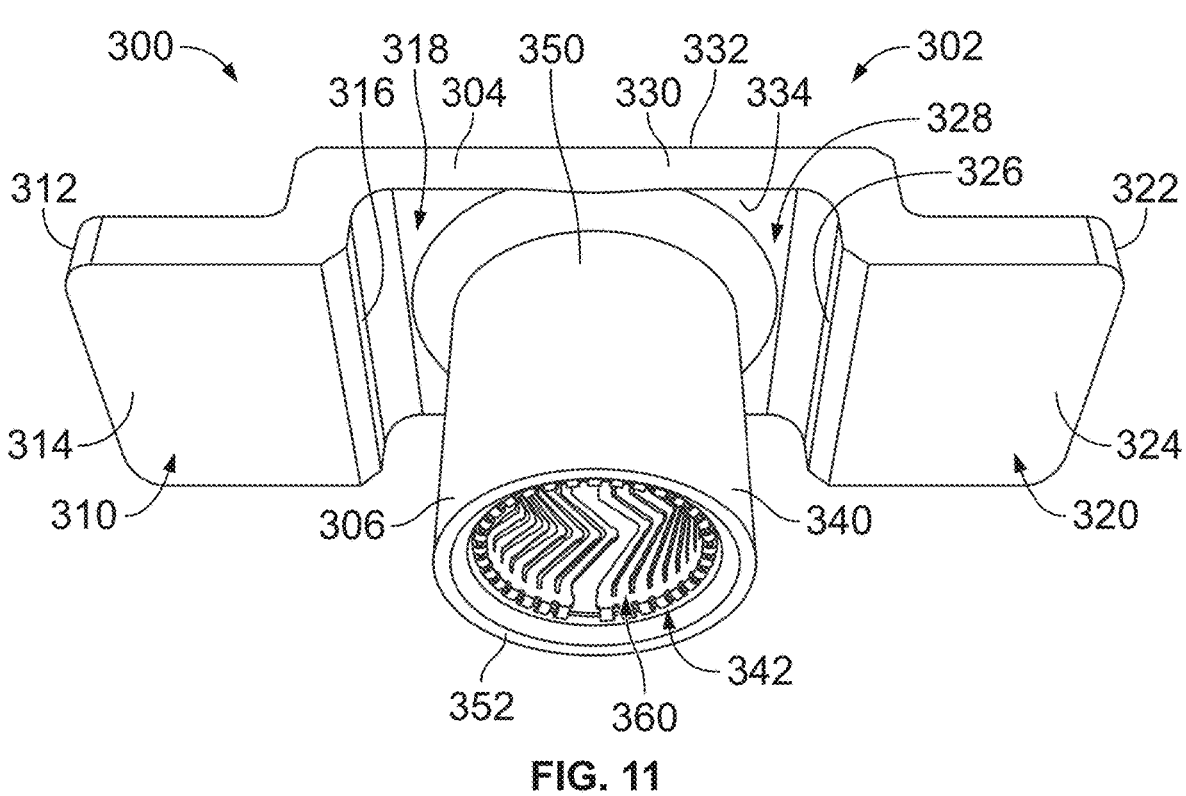
FIG. 11 is a perspective view of a socket assembly of the in-line power connector in accordance with an exemplary embodiment.

FIG. 11 is a perspective view of a socket assembly 302 of the in-line power connector 300 in accordance with an exemplary embodiment. The socket assembly 302 is configured to be electrically coupled to the pin terminal 570 (shown in FIG. 10). The socket assembly 302 is configured to be electrically coupled to the corresponding power cables, such as the intermediate line power cable 130 and the end line power cable 120 (both shown in FIG. 2). In an exemplary embodiment, the socket assembly 302 includes a busbar 304 and a socket terminal 306 extending from the busbar 304.

The busbar 304 includes a first cable terminator 310 at a first end 312 of the busbar 304 and a second cable terminator 320 at a second end 322 of the busbar 304. The first cable terminator 310 is configured to be terminated to the intermediate line power cable 130. The second cable terminator 320 is configured to be terminated to the power cable 120. The socket terminal 306 is located in line between the first cable terminator 310 and the second cable terminator 320. In an exemplary embodiment, the first cable terminator 310 includes a weld pad 314 configured be welded to the intermediate line power cable 130. The second cable terminator 320 includes a weld pad 324 configured to be welded to the end line power cable 120. Other types of cable terminators may be provided in alternative embodiments, such as crimp barrels.

In an exemplary embodiment, the busbar 304 includes a base 330 between the first cable terminator 310 and the second cable terminator 320. The base 330 includes an upper surface 332 and a lower surface 334. The first cable terminator 310 extends from a first side of the base 330 and the second cable terminator 320 extends from an opposite second side of the base 330. Optionally, the base 330 may be elevated above the weld pads 314, 324 of the cable terminators 310, 320, respectively. For example, the weld pads 314, 324 are non-coplanar with the base 330. A lip 316 extends between the base 330 and the weld pad 314 that forms a groove 318 between the weld pad 314 and the socket terminal 306. The groove 318 is located below the lower surface 334. The upper surface of the weld pad 314 is located below the upper surface 332 and the lower surface of the weld pad 314 is located below the lower surface 334. Similarly, a lip 326 extends between the base 330 and the weld pad 324 that forms a groove 328 between the weld pad 324 and the socket terminal 306. The groove 328 is located below the lower surface 334. The upper surface of the weld pad 324 is located below the upper surface 332 and the lower surface of the weld pad 324 is located below the lower surface 334. The grooves 318, 328 may receive portions of the header power connector 500 during mating.

The socket terminal 306 includes a terminal body 340 and a contact spring module 360 received in the terminal body 340. The terminal body 340 includes a socket opening 342 therethrough. The contact spring module 360 is located in the socket opening 342 and electrically connected to the terminal body 340. The contact spring module 360 is configured to be electrically connected to the pin terminal 570 when the pin terminal 570 is plugged into the socket opening 342. The contact spring module 360 forms a separable mating interface with the pin terminal 570.

The terminal body 340 extends from the busbar 304. In various embodiments, the terminal body 340 is integral with the busbar 304, such as being extruded with the busbar 304. However, in alternative embodiments, the terminal body 340 may be separate and discrete from the busbar 304 and coupled to the busbar 304. For example, the terminal body 340 of the socket terminal 306 may be separately manufactured and loaded into an opening in the base 330 of the busbar 304. In such embodiments, the terminal body 340 may be press-fit into the opening and/or welded to the busbar 304. When separately manufactured, the terminal body 340 may be manufactured from a different material than the busbar 304.

The terminal body 340 extends between an inner end 350 and an outer end 352. The inner end 350 is provided at the lower surface 334 of the busbar 304. The outer end 352 is located remote from the busbar 304, such as below the busbar 304. Other orientations are possible in alternative embodiments. The terminal body 340 is configured to receive the pin terminal 570 through the outer end 352. The socket opening 342 extends entirely through the terminal body 340 and is open at the inner end 350 and the outer end 352.

Figure 12:
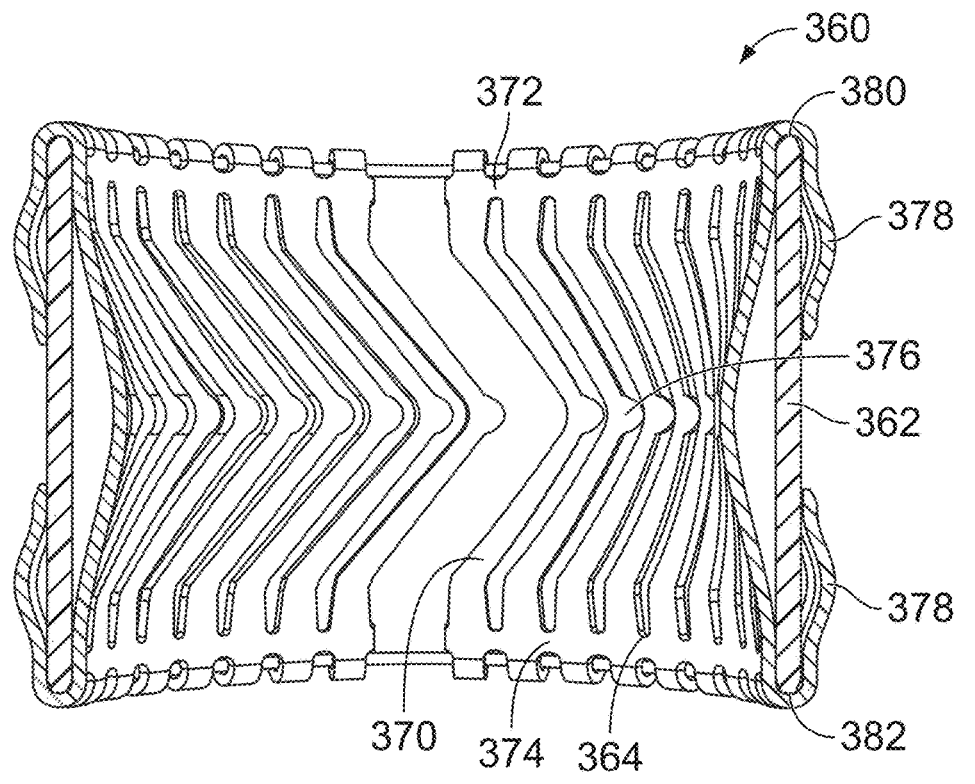
FIG. 12 is a perspective view of the contact spring module in accordance with an exemplary embodiment.

With additional reference to FIG. 12, a perspective view of the contact spring module 360 is shown. In an exemplary embodiment, the contact spring module 360 includes a support tube 362 and a spring ring 364 wrapped around the support tube 362. The spring ring 364 is compressible during mating with the pin terminal 570 (shown in FIG. 10). The spring ring 364 forms a reliable electrical connection with the pin terminal 570. The spring ring 364 includes multiple points of contact with the pin terminal 570 and multiple points of contact with the terminal body 340 (FIG. 11) to create a conductive path between the pin terminal 570 and the terminal body 340. Other types of spring elements or round terminals having separable mating interfaces may be used in alternative embodiments.

In an exemplary embodiment, the spring ring 364 is stamped and formed and wrapped into a ring-shaped. The spring ring 364 includes a plurality of spring elements 370. In an exemplary embodiment, the spring elements 370 are connected together by connecting elements forming a first band 372 at the top of the spring ring 364 and a second band 374 at the bottom of the spring ring 364. The spring elements 370 are arch shaped or V-shaped between the bands 372, 374. The spring elements 370 are flexed inward between the bands 372, 374 such that the spring ring 364 has an hourglass shape being narrower in the middle and wider at the bands 372, 374. The spring elements 370 have mating interfaces 376 in the middle between the bands 372, 374 to interface with the pin terminal 570. In an exemplary embodiment, when the spring ring 364 is formed in the ring-shaped, the spring elements 370 form torsional springs configured to interface with the pin terminal 570. The spring elements 370 may be flexed outward when the pin terminal 570 is plugged into the socket opening 342 to create a reliable mechanical and electrical connection between the spring ring 364 and the pin terminal 570.

In an exemplary embodiment, upper and lower ends of the spring elements 370 are wrapped around the support tube 362 to form outer spring elements 378. For example, the outer spring elements 378 are wrapped around a first end 380 and a second end 382 of the support tube 362. The outer spring elements 378 are shaped to interface with the terminal body 340 when the spring ring 364 is received in the socket opening 342. The outer spring elements 378 are deflectable to create a reliable electrical connection between the spring ring 364 and the terminal body 340.

Other types of socket terminals may be used in alternative embodiments to create an electrical connection between the pin terminal 570 and the busbar 304.

Figure 13:
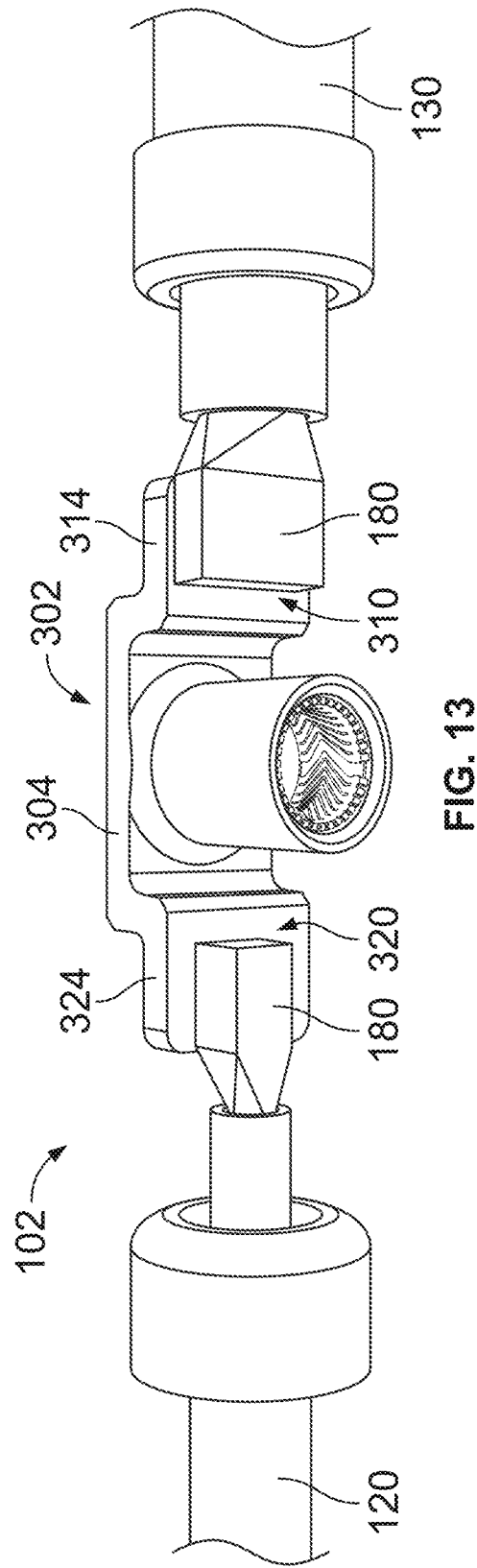
FIG. 13 illustrates a portion of the power cable harness showing the socket assembly of the in-line power connector in accordance with an exemplary embodiment.
Figure 14:
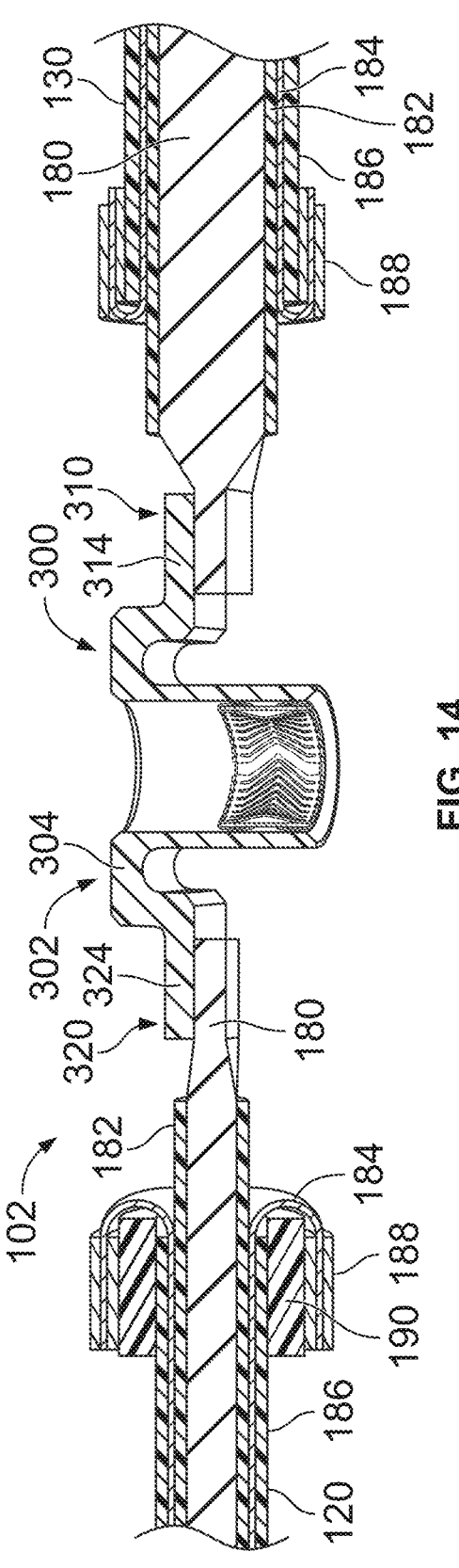
FIG. 14 is a cross-sectional view of a portion of the power cable harness showing the socket assembly of the in-line power connector in accordance with an exemplary embodiment.

FIG. 13 illustrates a portion of the power cable harness 102 showing the socket assembly 302 of the in-line power connector 300 in accordance with an exemplary embodiment. FIG. 14 is a cross-sectional view of a portion of the power cable harness 102 showing the socket assembly 302 of the in-line power connector 300 in accordance with an exemplary embodiment. FIGS. 13 and 14 show the intermediate line power cable 130 terminated to the first cable terminator 310 of the busbar 304 and the end line power cable 120 terminated to the second cable terminator 320 of the busbar 304. For example, the power cables 120, 130 may be welded to the weld pads 324, 314, respectively. Optionally, the weld pads 314, 324 may be wide enough to accommodate termination of two cables to provide a split inline connector (for example, splitting a single input cable into a pair of output cables).

The cables 120, 130 are similar to each other and include similar components. However, the cables 120, 130 may be different gauge cables. Each cable includes a center conductor 180, and an insulator 182, a cable shield 184, and an outer jacket 186. The center conductor 180 may be a solid conductor or a stranded or braided conductor. The center conductor 180 may be aluminum rather than copper to reduce weight of the cable harness. The insulator 182 electrically separate the center conductor 180 from the cable shield 184. The cable shield 184 provides electrical shielding for the cable and provides an electrical ground reference for the cable. The cable shield 184 is configured to be electrically connected to other shielded and/or grounded components. In an exemplary embodiment, a cable crimp 188 is provided for electrically connecting the cable shield 184 to the other shielded and/or grounded components of the power cable harness 102. In an exemplary embodiment, one or both of the cables may include a crimp spacer 190 for supporting the cable shield 184. The crimp spacer 190 allows the use of the same cable crimps 188 4 both cables, even when the cables have different diameters.

Figure 15:
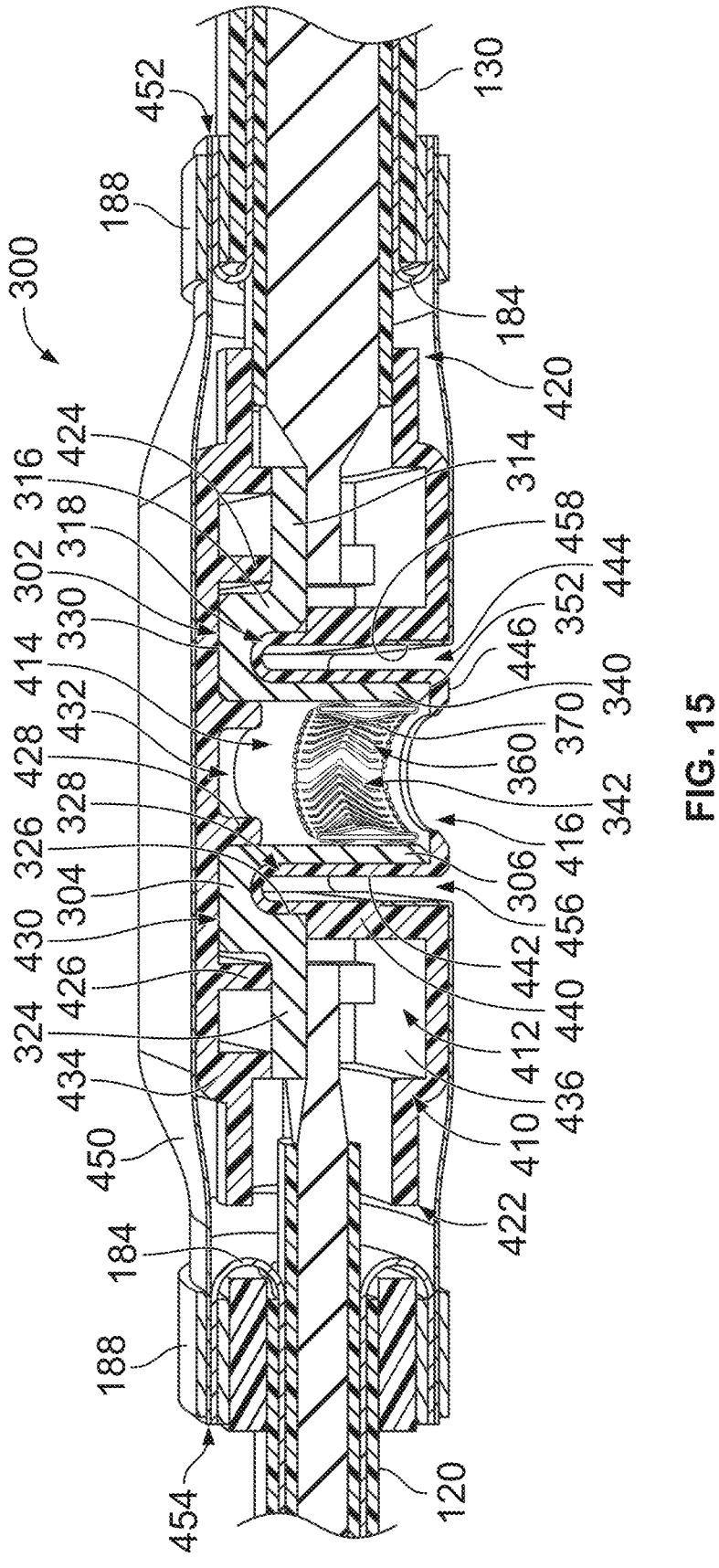
FIG. 15 is a cross-sectional view of a portion of the in-line power connector in accordance with an exemplary embodiment.

FIG. 15 is a cross-sectional view of a portion of the in-line power connector 300 in accordance with an exemplary embodiment. The outer housing 460 (FIG. 5) is removed to illustrate the internal components of the in-line power connector 300. The in-line power connector 300 includes the socket assembly 302, an inner housing 410 supporting the socket assembly 302, and an in-line shield 450 surrounding the inner housing 410. The in-line shield 450 is configured to be electrically connected to the cable shields 184 of the cables 120, 130.

The inner housing 410 includes a busbar cavity 412 that receives the busbar 304 and a socket terminal cavity 414 that receives the socket terminal 306. The inner housing 410 holds the busbar 304 in the busbar cavity 412. The inner housing 410 holds the socket terminal 306 and the socket terminal cavity 414. The inner housing 410 has a housing opening 416 aligned with the socket opening 342. The housing opening 416 receives the pin terminal 570 (shown in FIG. 5) as the pin terminal 570 is mated with the socket terminal 306.

The inner housing 410 extends between a first end 420 and a second end 422. The inner housing 410 receives the intermediate line power cable 130 at the first end 420. The weld pad 314 is located proximate to the first end 420. In an exemplary embodiment, the inner housing 410 includes support walls 424 that support the weld pad 314. The inner housing 410 receives the end line power cable 120 at the second end 422. The weld pad 324 is located proximate to the second end 422. In an exemplary embodiment, the inner housing 410 includes support walls 426 that support the weld pad 324. In an exemplary embodiment, the inner housing 410 includes support walls 428 that support the base 330 of the busbar 304. For example, the support walls 428 extend into the socket terminal 306 to position the base 330 relative to the inner housing 410. In an exemplary embodiment, a pocket 430 is defined between the support walls 428 and the support walls 424, 426. The base 330 is received in the pocket 430 to hold a side to side positioning of the busbar 304 relative to the inner housing 410. In an exemplary embodiment, the inner housing 410 includes a pin pocket 432 between the support walls 428. The pin pocket 432 is configured to receive the distal end of the pin terminal 570. The pin pocket 432 is used to center the pin terminal 570 within the socket terminal 306, such as to prevent damage to the contact springs module 360 due to overstress of the spring elements 370.

In an exemplary embodiment, the inner housing 410 is a multipiece housing. For example, the inner housing 410 includes an upper housing 434 and a lower housing 436. The upper housing 434 may be coupled to the lower housing 436 to form the busbar cavity 412 therebetween. The upper housing 434 and the lower housing 436 may be separately coupled to the socket assembly 302. For example, the busbar 304 may be initially coupled to the upper housing 434 prior to coupling the lower housing 436 to the socket assembly 302, or vice versa.

In an exemplary embodiment, the lower housing 436 of the inner housing 410 includes support walls 440 that engage the weld pads 314, 324 and/or the lips 316, 326. The support walls 440 position the busbar 304 relative to the lower housing 436. In an exemplary embodiment, the lower housing 436 includes a liner 442 lining the exterior surface of the socket terminal 306. The liner 442 extends into the grooves 318, 328 (the grooves 318, 328 may be opposite sides of a circumferential groove surrounding the socket terminal 306). Gaps 444 are defined between the liner 442 and the support walls 440. The gaps 444 may receive portions of the header power connector 500. In an exemplary embodiment, the liner 442 includes a cap 446 covering the outer end 352 of the terminal body 340. The cap 446 forms a touch safe cap for the socket terminal 306 that prevents inadvertent touching of the conductive portion of the socket terminal 306.

The in-line shield 450 surrounds the inner housing 410. The in-line shield 450 extends between a first shield end 452 and a second shield end 454. The first shield end 452 is coupled to the cable shield 184 of the intermediate line power cable 130. For example, the cable crimp 188 connects the in-line shield 450 to the cable shield 184 when the cable crimp 188 is crimped. The second shield end 454 is coupled to the cable shield 184 of the end line power cable 120. For example, the cable crimp 188 connects the in-line shield 450 to the cable shield 184 when the cable crimp 188 is crimped. The in-line shield 450 electrically commons the cable shield 184 of the intermediate line power cable 130 and the cable shield 184 of the end line power cable 120. In an exemplary embodiment, the in-line shield 450 includes a shield opening 456 aligned with the socket opening 342 to receive the pin terminal 570. In an exemplary embodiment, the in-line shield 450 includes shield tabs 458 around the shield opening 456. The shield tabs 458 are bent inward into the gaps 444. The shield tabs 458 are configured to be electrically connected to the header power connector 500 when the in-line power connector 300 is mated to the header power connector 500.

Figure 16:
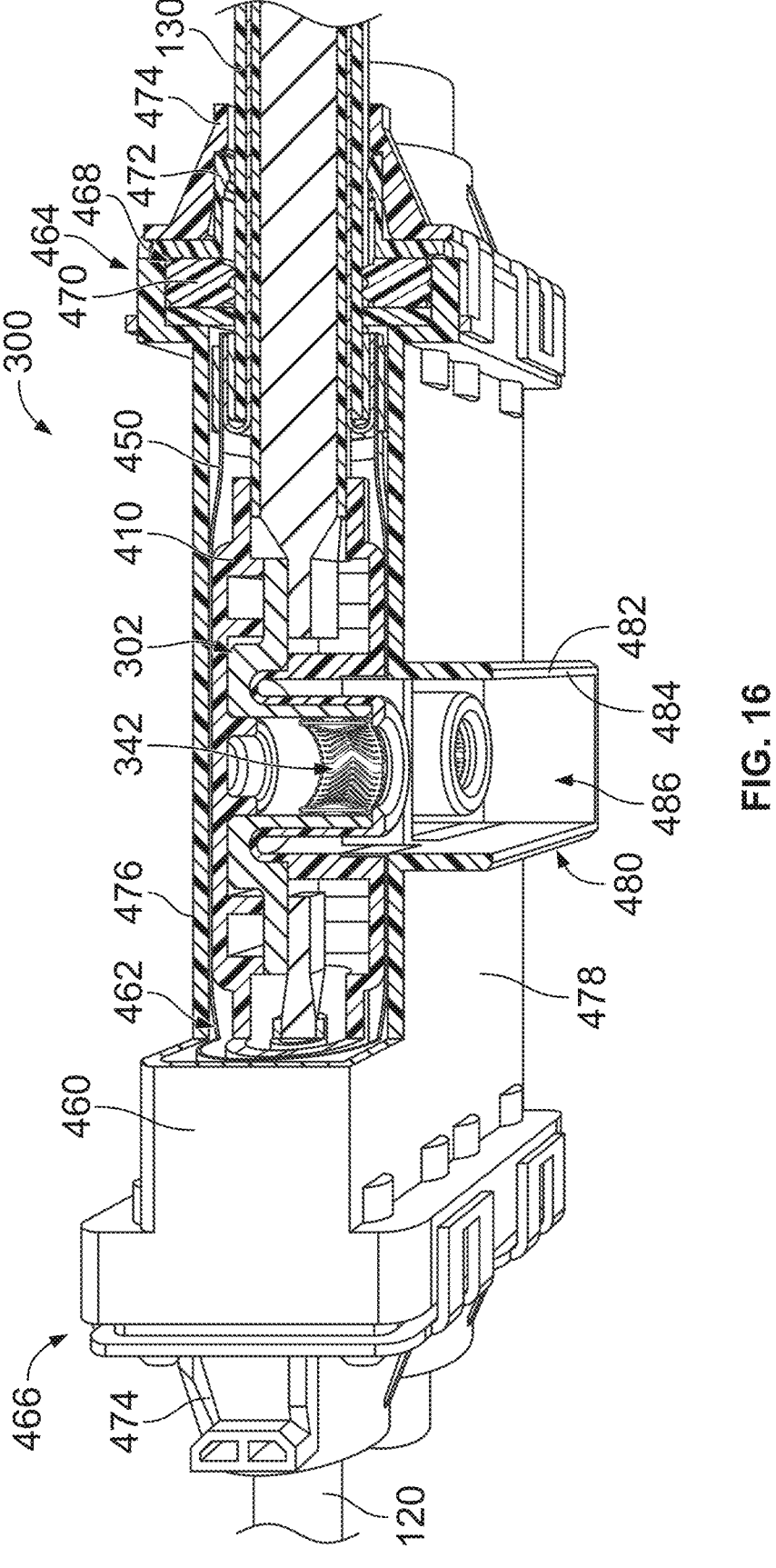
FIG. 16 is a cross-sectional view of a portion of the in-line power connector in accordance with an exemplary embodiment.

FIG. 16 is a cross-sectional view of a portion of the in-line power connector 300 in accordance with an exemplary embodiment. FIG. 16 shows the outer housing 460 surrounding the in-line shield 450, the inner housing 410, and the socket assembly 302. For example, the outer housing 460 includes a cavity 462 that receives the in-line shield 450, the inner housing 410, and the socket assembly 302. Optionally, the cavity 462 may be sized to receive a pair of the inner components (for example, positive and negative inner components).

The outer housing 460 is manufactured from a dielectric material, such as a plastic material. The outer housing 460 may be a molded part. The outer housing 460 extends between a first end 464 and a second end 466. The outer housing 460 includes ports 468 at the first and second ends 464, 466 that receive the corresponding power cables 130, 120. In an exemplary embodiment, a cable seal 470 is provided at the port 468 between the power cable 130, 120 and the outer housing 460. The cable seal 470 provide a sealed interface between the power cable 130, 120 and the outer housing 460. In an exemplary embodiment, a cable strain relief element 472 is provided between the outer housing 460 and the power cable 130, 120. The cable strain relief element 472 provide strain relief for the power cable 130, 120. The cable strain relief element 472 prevents overbending of the power cable 130, 120, Such as to ensure that the cable seal 470 remains sealed to the power cable 130, 120. In an exemplary embodiment, cable covers 474 are coupled to the first and second ends 464, 466 of the outer housing 460. The cable covers 474 hold the cable strain relief element 472 in position relative to the cable seal 470 and/or the outer housing 460 And/or the cable 130, 120. The cable covers 474 may be secured to the outer housing 460 using latches, clips, fasteners, or other securing means. For example, the cable covers 474 may be secured to a top wall 476 and/or a bottom wall 478 of the outer housing 460.

In an exemplary embodiment, the outer housing 460 includes a hub 480 in-line between the first end 464 and the second end 466. The hub 480 includes hub walls 482 extending from the bottom wall 478 of the outer housing 460. The hub walls 482 extend to a distal end 484 of the hub 480. The hub walls 482 surround a hub opening 486 is aligned with the socket opening 342 to receive the pin terminal 570.

Figure 17:
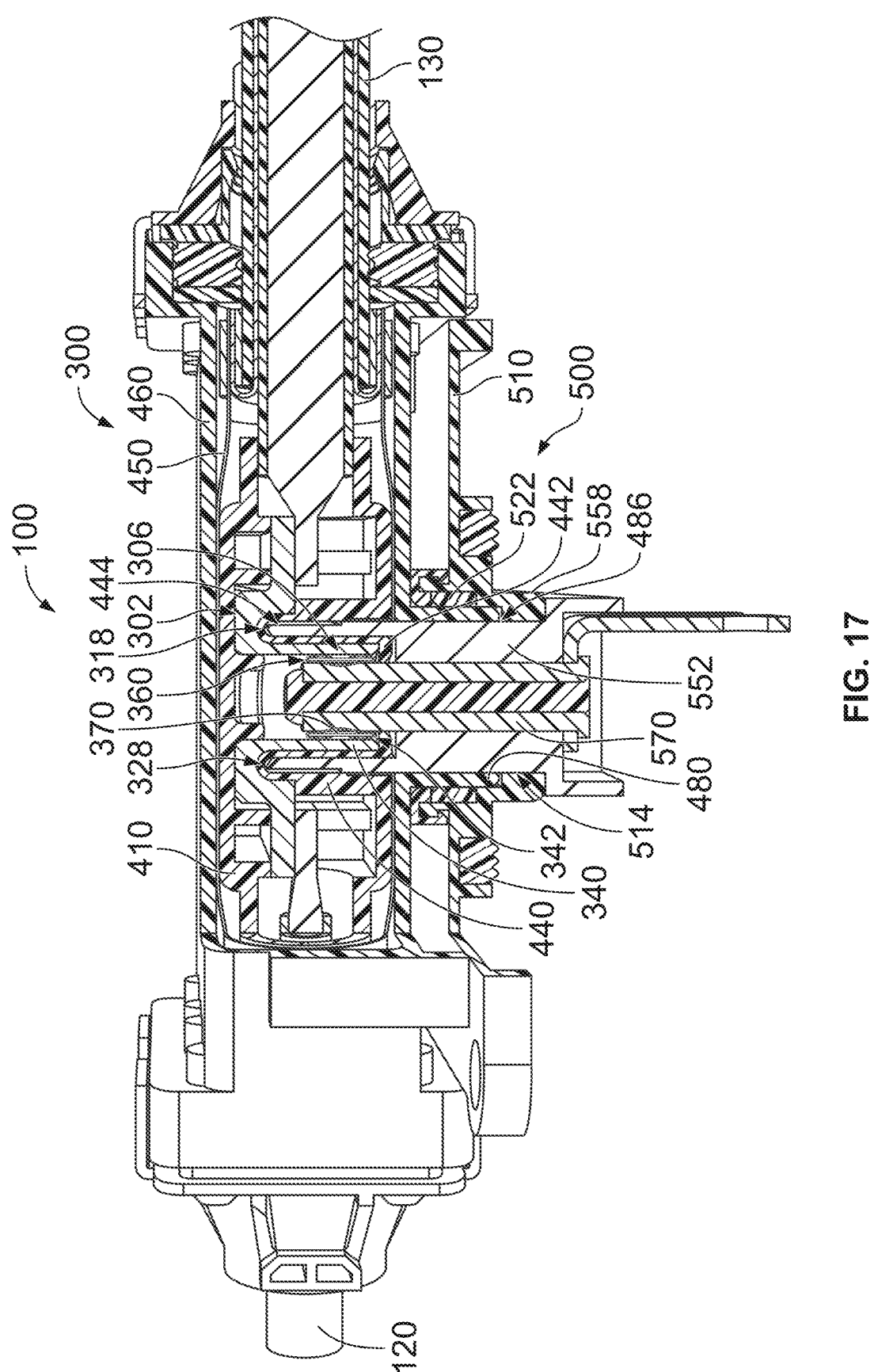
FIG. 17 is a partial sectional view of the power connector system showing the in-line power connector coupled to the header power connector in accordance with an exemplary embodiment.

FIG. 17 is a partial sectional view of the power connector system 100 showing the in-line power connector 300 coupled to the header power connector 500. The in-line power connector 300 has a low-profile (for example, a short vertical height) for mating with the header power connector 500. For example, the electrical interface is located in line with the power cables 120, 130. The connector may have a height of less than 50 mm off of the device of the vehicle subsystem, such as approximately 43.5 mm. A shielded and sealed electrical connection is made between the in-line power connector 300 and the header power connector 500. The in-line power connector 300 is configured to accommodate different sized power cables within the same package. The socket assembly 302 of the in-line power connector 300 provides both a mating interface to the header power connector 500 as well as a daisy chain connection to the downstream power cable 120. In various embodiments, the in-line power connector 300 may be a split in-line power connector that allows multiple downstream power cables to be connected to the same socket assembly 302. The connectors have a module design allowing different daisy chain and branching configurations spanning from a single battery connection. The connectors accommodate different gauge power cables using the same connector parts or components for reduced design and assembly cost.

During mating, the outer housing 460 is coupled to the header housing 510. The inline power connector 300 is connected to the header power connector at a reliable, secure interface that is resistant to vibration. The hub 480 is plugged into the header opening 514 of the header housing 510. The hub 480 engages the interface seal 522 to create a sealed interface between the header housing 510 and the outer housing 460. The insert 552 is plugged into the in-line power connector 300. For example, the insert 552 passes through the hub opening 486 into the gaps 444 of the inner housing 410 between the liner 442 and the support walls 440. The distal end of the insert 552 may be located in the grooves 318, 328. The pin terminal 570 is plugged into the socket opening 342 to mate with the socket terminal 306. For example, the pin terminal 570 interfaces with the spring elements 370 of the contact spring module 360. An electrical path is created between the pin terminal 570 and the terminal body 340 of the socket terminal 306 via the spring elements 370 of the contact spring module 360. The spring elements 370 define multiple points of contact with the pin terminal 570. For example, the contact spring module 360 may include 30 or more spring elements 370 circumferentially surrounding the pin terminal 570. The mating interface between the pin terminal 570 and the socket terminal 306 is shielded by the in-line shield 450 and the header shield 558. The in-line power connector 300 is electrically grounded to the header power connector 500 through the header shield 558 and the in-line shield 450.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. An inline power connector for a power cable harness, the inline power connector comprising:

a socket assembly including a busbar and a socket terminal extending from the busbar, the busbar including a first cable terminator at a first end of the busbar and a second cable terminator at a second end of the busbar, the first cable terminator configured to be terminated to a first cable of the power cable harness, the second cable terminator configured to be terminated to a second cable of the power cable harness, the socket terminal located inline between the first cable terminator and the second cable terminator, the socket terminal including a socket opening configured to receive a pin terminal;

an inner housing having a busbar cavity receiving the busbar and a socket terminal cavity receiving the socket terminal, the inner housing holding the busbar in the busbar cavity and holding the socket terminal in the socket terminal cavity, the inner housing having a housing opening aligned with the socket opening to receive the pin terminal, the inner housing configured to receive the first cable at a first end of the inner housing and configured to receive the second cable at a second end of the inner housing; and an outer housing having a cavity receiving the inner housing and the socket assembly, the outer housing including a first cable port at a first end of the outer housing configured to receive the first cable and a second cable port at a second end of the outer housing configured to receive the second cable, the outer housing including a hub inline between the first end and the second end, the hub having a hub opening aligned with the socket opening to receive the pin terminal.

2. The inline power connector of claim 1, wherein the first cable terminator includes a first weld pad configured to be welded to the first cable and the second cable terminator includes a second weld pad configured to be welded to the second cable.

3. The inline power connector of claim 2, wherein the second weld pad is configured to be terminated to a third cable extending into the outer housing through the second end of the outer housing, the busbar configured to electrically connect the first cable to both the second and third cables.

4. The inline power connector of claim 1, wherein the busbar includes a base, the socket terminal extending from the base, the first and second cable terminators extending from opposite sides of the base, the first and second cable terminators being non-coplanar with the base such that the first and second cable terminators are aligned with a portion of the socket terminal.

5. The inline power connector of claim 4, wherein grooves are formed between the socket terminal and the first and second cable terminators, the inner housing extending into the grooves.

6. The inline power connector of claim 1, wherein the socket terminal is separate and discrete from the busbar, the busbar including an opening, the socket terminal received in the opening in the busbar, the socket terminal being at least one of press-fit and welded to the busbar.

7. The inline power connector of claim 1, wherein the socket terminal includes a spring ring in the socket opening electrically connected to the socket terminal, the spring ring including spring elements in a circumferential arrangement having mating interfaces configured to electrically connect to the pin terminal.

8. The inline power connector of claim 7, wherein the spring ring includes a first band and a second band, the spring elements extending between the first band and the second band.

9. The inline power connector of claim 7, wherein the socket terminal includes a support tube having a first end and a second end, the spring ring being coupled to the support tube, the spring elements being wrapped around a first end and a second end of the support tube forming outer spring fingers extending along an exterior of the support tube at the first end and the second end of the support tube, the outer spring fingers interfacing with the socket terminal.

10. The inline power connector of claim 1, further comprising an inline shield surrounding the inner housing and received in the cavity of the outer housing, the inline shield having a first shield end configured to be coupled to a cable shield of the first cable, the inline shield having a second shield end configured to be coupled to a cable shield of the second cable, the inline shield including a shield opening aligned with the socket opening to receive the pin terminal.

11. The inline power connector of claim 10, wherein the inline shield is configured to be crimped to cable shields of the first and second cables to electrically connect the cable shields of the first and second cables.

12. The inline power connector of claim 1, wherein the inner housing includes an upper housing and a lower housing forming the busbar cavity therebetween, the lower housing including a liner lining an exterior of the socket terminal and covering a distal end of the socket terminal to form a touch safe cap for the socket terminal.

13. The inline power connector of claim 1, wherein the outer housing includes a bottom wall, the hub includes hub walls extending from the bottom wall to a distal end, the hub opening located between the hub walls, the socket terminal being elevated above the distal end of the hub.

14. The inline power connector of claim 1, further comprising cable seals and cable end caps coupled to the first and second cables at the first and second cable ports of the outer housing.

15. A power connector system for connecting a power cable harness to a vehicle subsystem of an electric vehicle, the power connector system comprising:

a header power connector having a header housing holding a header busbar and a pin terminal extending from the header busbar, the header busbar configured to be terminated to the vehicle subsystem to power the vehicle subsystem; and an inline power connector coupled to the header power connector to supply power to the vehicle subsystem, the inline power connector including a socket assembly, an inner housing holding the socket assembly, and an outer housing surrounding the inner housing;

the socket assembly including a busbar and a socket terminal extending from the busbar, the busbar including a first cable terminator at a first end of the busbar and a second cable terminator at a second end of the busbar, the first cable terminator configured to be terminated to a first cable of the power cable harness, the second cable terminator configured to be terminated to a second cable of the power cable harness, the socket terminal located inline between the first cable terminator and the second cable terminator, the socket terminal including a socket opening configured to receive the pin terminal;

the inner housing having a busbar cavity receiving the busbar and a socket terminal cavity receiving the socket terminal, the inner housing holding the busbar in the busbar cavity and holding the socket terminal in the socket terminal cavity, the inner housing having a housing opening aligned with the socket opening to receive the pin terminal, the inner housing configured to receive the first cable at a first end of the inner housing and configured to receive the second cable at a second end of the inner housing; and the outer housing having a cavity receiving the inner housing, and the socket assembly, the outer housing including a first cable port at a first end of the outer housing configured to receive the first cable and a second cable port at a second end of the outer housing configured to receive the second cable, the outer housing including a hub inline between the first end and the second end, the hub having a hub opening aligned with the socket opening to receive the pin terminal, the hub being plugged into the header housing when the inline power connector is coupled to the header power connector.

16. The power connector system of claim 15, wherein the busbar includes a base, the socket terminal extending from the base, the first and second cable terminators extending from opposite sides of the base, the first and second cable terminators being non-coplanar with the base such that the first and second cable terminators are aligned with a portion of the socket terminal, grooves being formed between the socket terminal and the first and second cable terminators, the inner housing extending into the grooves.

17. The power connector system of claim 15, further comprising an inline shield surrounding the inner housing and received in the cavity of the outer housing, the inline shield having a first shield end configured to be coupled to a cable shield of the first cable, the inline shield having a second shield end configured to be coupled to a cable shield of the second cable, the inline shield including a shield opening aligned with the socket opening to receive the pin terminal.

18. A power cable harness for connecting a battery to a plurality of vehicle subsystems of an electric vehicle, the power cable harness comprising:

a primary line power cable extending between a first cable end and a second cable end, the primary line power cable having a first cable end connector at the first cable end of the primary line power cable configured to be coupled to the battery;

an intermediate line power cable extending between a first cable end and a second cable end, the intermediate line power cable having a first inline power connector at the first cable end of the intermediate line power cable and a second inline power connector at the second cable end of the intermediate line power cable, the first inline power connector being terminated to the second cable end of the primary line power cable to receive power from the primary line power cable, the first inline power connector configured to be coupled to a first vehicle subsystem of the plurality of vehicle subsystems to supply power to the first vehicle subsystem, the second inline power connector configured to be coupled to a second vehicle subsystem of the plurality of vehicle subsystems to supply power to the second vehicle subsystem; and an end line power cable extending between a first cable end and a second cable end, the first cable end of the end line power cable being terminated to the second inline power connector, the end line power cable having a second cable end connector at the second end of the end line power cable configured to be coupled to a third vehicle subsystem of the plurality of vehicle subsystems to supply power to the third vehicle subsystem;

wherein the first inline power connector includes a socket assembly, an inner housing holding the socket assembly, an inline shield surrounding the inner housing, and an outer housing surrounding the inline shield;

the socket assembly including a busbar and a socket terminal extending from the busbar, the busbar including a first cable terminator at a first end of the busbar and a second cable terminator at a second end of the busbar, the first cable terminator configured to be terminated to a first cable of the power cable harness, the second cable terminator configured to be terminated to a second cable of the power cable harness, the socket terminal located inline between the first cable terminator and the second cable terminator, the socket terminal including a socket opening configured to receive the pin terminal, the socket terminal including a spring ring in the socket opening electrically connected to the socket terminal, the spring ring including spring elements in a circumferential arrangement having mating interfaces configured to electrically connect to the pin terminal;

the inner housing having a busbar cavity receiving the busbar and a socket terminal cavity receiving the socket terminal, the inner housing holding the busbar in the busbar cavity and holding the socket terminal in the socket terminal cavity, the inner housing having a housing opening aligned with the socket opening to receive the pin terminal, the inner housing configured to receive the first cable at a first end of the inner housing and configured to receive the second cable at a second end of the inner housing;

the inline shield having a first shield end configured to be coupled to a cable shield of the first cable, the inline shield having a second shield end configured to be coupled to a cable shield of the second cable, the inline shield including a shield opening aligned with the socket opening to receive the pin terminal; and the outer housing having a cavity receiving the inline shield, the inner housing, and the socket assembly, the outer housing including a first cable port at a first end of the outer housing configured to receive the first cable and a second cable port at a second end of the outer housing configured to receive the second cable, the outer housing including a hub inline between the first end and the second end, the hub having a hub opening aligned with the socket opening to receive the pin terminal, the hub being plugged into the header housing when the inline power connector is coupled to the header power connector.

19. The power cable harness of claim 18, wherein the intermediate line power cable is daisy chained to the primary line power cable by the first inline power connector, and wherein the end line power cable is daisy chained to the intermediate line power cable by the second inline power connector.

20. The power cable harness of claim 18, further comprising a branch line power cable extending between a first cable end and a second cable end, the first cable end of the branch line power cable being terminated to one of the first inline power connector or the second inline power connector, the branch line power cable having a second cable end connector at the second end of the branch line power cable configured to be coupled to a fourth vehicle subsystem of the plurality of vehicle subsystems to supply power to the fourth vehicle subsystem.

* * * * *